Dec. 7, 1965 R. G. MOY ETAL 3,222,543

ULTRASONIC DELAY LINE CIRCULATING MEMORY SYSTEM

Filed May 11, 1962 2 Sheets-Sheet 1

D.C. AMPLIFIER-HYBRID T.D.-TRANSISTOR TRIGGER CIRCUIT

INVENTORS:
ROBERT G. MOY &
MORTON SILVERBERG

BY John V. Regan
Attorney

ULTRASONIC DELAY LINE CIRCULATING MEMORY SYSTEM

Filed May 11, 1962 2 Sheets-Sheet 2

INVENTORS
ROBERT G. MOY &
MORTON SILVERBERG
BY John V. Regan
Attorney

United States Patent Office 3,222,543
Patented Dec. 7, 1965

3,222,543
ULTRASONIC DELAY LINE CIRCULATING MEMORY SYSTEM

Robert G. Moy, Haddonfield, and Morton Silverberg, Riverton, N.J., assignors to Radio Corporation of America, a corporation of Delaware
Filed May 11, 1962, Ser. No. 193,923
3 Claims. (Cl. 307—88.5)

This invention relates to circulating memory systems, and to circuits suitable for sampling and reclocking non-return-to-zero information signals.

In circulating memory systems using delay lines, the delay line accepts a word or bit configuration at its input, and the word that appears at the output of the delay line is processed by suitable electronic circuits for recirculating the information back to the input of the delay line. In the recirculating loop the information signal is amplified, to compensate for the attenuation of the line, and the information signal is reconstructed and retimed. It is a primary consideration in these systems to maintain the correct timing of the stored word.

Another important consideration in a memory system is its maximum storage capacity, that is, the maximum number of bits of information that can be stored and recirculated in a given circulating time. The storage capacity in a delay line memory system depends on the method of recording the information. One method used in recording digital information is the return-to-zero (RZ) method in which binary ones are represented by current pulses of one polarity, positive for example, and binary zeros by current pulses of the opposite polarity, negative for example, or in which binary ones are represented by current pulses and binary zero by the absence of pulses. In either case the current returns to a value of zero after each bit is recorded.

Another method of recording is the non-return-to-zero method (NRZ). The term NRZ applies to several recording methods in which the current is switched in an appropriate fashion to record information, but the magnitude of the current does not remain at zero for an appreciable amount of time.

The use of NRZ is advantageous because the capacity of the line is larger compared to the capacity of the line when the RZ method of recording is used.

Acoustic delay line storage has been used in many systems in the past. The information in many of those systems is stored as a sequence of bits, pulses representing ones and the absence of pulses representing zeros. A line driver circuit causes each pulse to apply a fractional microsecond burst of R.-F. power to a transducer at the transmitting end of the line. After a time equal to the total delay of the line, the acoustic pulse strikes the receiving transducer and produces a voltage which can be detected and amplified. The amplified pulse is then gated and reshaped by a timing pulse and re-entered into the delay line. Stored information is thus circulated indefinitely, and can be read at times when it is re-entered.

In the prior art, mercury, magnetrostrictive and ultrasonic delay lines have been used in circulating memories, each has one or more disadvantages with respect to variations caused by temperature and the amount of information that can be stored. Moreover, the last-mentioned type of delay line has been restricted to a return-to-zero type recording system.

It is an object of this invention to provide an improved acoustic delay line memory using a non-return-to-zero method of recording.

It is another object of this invention to provide an improved circulating memory system using non-return-to-zero method of recording in which high frequency information signals are precisely reclocked after having gone through an ultrasonic delay line, and before they are recirculated through the delay line.

An example of a circulating memory system according to the invention includes an ultrasonic delay line to which non-return-to-zero input information signals are applied. The output of the delay line includes at least a half cycle sinewave signal in response to each transition between a level representing binary one and a level representing binary zero, and it has a polarity corresponding to the polarity of the transition. The output of the delay line is coupled to a trigger circuit that has conduction and non-conduction thresholds, so that the trigger circuit switches conduction state when the input signal to the trigger circuit exceeds one threshold and it remains in that state until the opposite threshold is exceeded. The trigger circuit provides an output signal which is a reconstituted non-return-to-zero input signal. The output from the trigger circuit is coupled to a midpoint between a pair of tunnel diodes connected cathode-to-anode. A clock pulse source drives a multivibrator circuit for applying pulses of opposite polarity and at the clock frequency across the tunnel diodes. A bipolar output signal is derived at the midpoint of the diodes. This signal comprises pulses at the clock frequency having the polarity of the non-return-to-zero signal. A second trigger circuit, which operates like the first trigger circuit, is triggered into conduction and into cut-off by the bipolar output signals from the diodes. The output of this second trigger circuit is a non-return-to-zero information signal having sharp leading and lagging edges and corresponding to the non-return-to-zero input information signals applied to the delay line. This output of the second trigger circuit is applied to the delay line, and a new circulating cycle is started.

Figure 1:
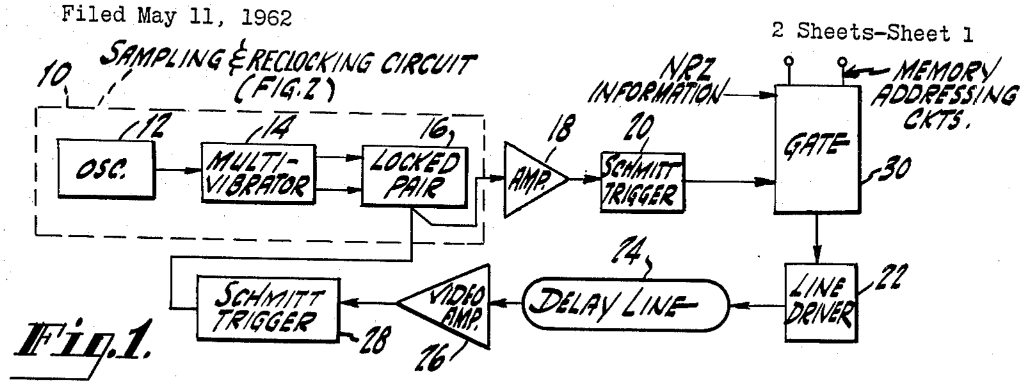
FIGURE 1 is a block diagram of a circulating memory system according to the invention.

Referring now to the various figures of the drawing and particularly to FIGURE 1, there is illustrated a delay line 24 to which a non-return-to-zero information signal is applied. The delay line 24 may be an ultrasonic type such as a fused silicon solid delay line or a fused quartz solid delay line as described in "High Frequency Ultrasonic Delay Lines," Solid State Journal, March 1961. The NRZ signal may be taken from a magnetic tape, for example, and may be applied to a gate circuit 30 which has memory addressing circuits inputs. The non-return-to-zero information signal is clocked by any suitable means to a clock pulse source, such as oscillator 12, so that the information may be written and read out of the memory at the appropriate time. The NRZ information signal comprises a first level representing binary one, a second level representing binary zero, and a transition edge between the two levels. An NRZ signal waveform is illustrated in FIGURE 3*a*.

When the gate 30 is activated, the information signal is coupled to a line driver 22, which provides a high current input to the delay line. The line driver 22, may be a complementary emitter follower as described in "Junction Transistor Electronics," chapter 9, p. 184, Fig. 9.10, by R. Hurley. The output from the line driver 22 is coupled to the input of the ultrasonic delay line 24.

The output of the delay line 24 includes at least a half cycle sinewave in response to each transition of the NRZ signal as illustrated in FIGURE 3*b*.

The output of the delay line 24 is coupled to a video amplifier 26, which compensates for the attenuation of the delay line (which may be approximately 60 db at a frequency of 20 mc./sec. and which may provide an inversion of the output signal of the delay line. The video amplifier may be a high gain, feedback video amplifier as described in "Junction Transistor Electronics," chapter 14, p. 269, Fig. 14–3, by R. Hurley.

The signal output from the video amplifier is coupled to a Schmitt trigger circuit 28. The Schmitt trigger 28 is arranged to have a conduction and a non-conduction state determined by respective conduction and non-conduction thresholds. The trigger circuit 28 remains in the conduction state until the input signal falls below the non-conduction threshold.

The output from the Schmitt trigger 28 is coupled to a sampling and reclocking circuit 10. The reclocking circuit comprises a clock pulse source, such as oscillator 12, a free running multivibrator 14, which is driven by the oscillator 12, and a tunnel diode locked pair 16. The multivibrator 14 and the locked pair circuit 16 are described in detail in connection with FIGURE 2. The oscillator 12 may be as illustrated in "Junction Transistor Electronics," chapter 17, p. 319, by R. Hurley.

The output signal from the Schmitt trigger is coupled to the locked pair 16 and the output of multivibrator 14 is also coupled to the locked pair 16. The output signal from the locked pair 16 is a bipolar series of pulses as illustrated in FIGURE 3*f*, and the polarity of each series of pulses is determined by the transition edges of the NRZ signal from the Schmitt trigger 28. Further, the locked pair pulses have the same frequency as the clock source pulses.

The output from the locked pair is coupled through any suitable known high input impedance D.C. amplifier 18 to a second Schmitt trigger 20. This second Schmitt trigger operates like the first Schmitt trigger previously described, and its output signal is a reconstituted NRZ signal which has been resynchronized by the clock pulses applied to the locked pair.

The reconstituted NRZ signal from the second Schmitt trigger 20 is applied to the gate 30 which is activated so that a recirculating cycle starts, and so on.

Figures 2, 4, 5:
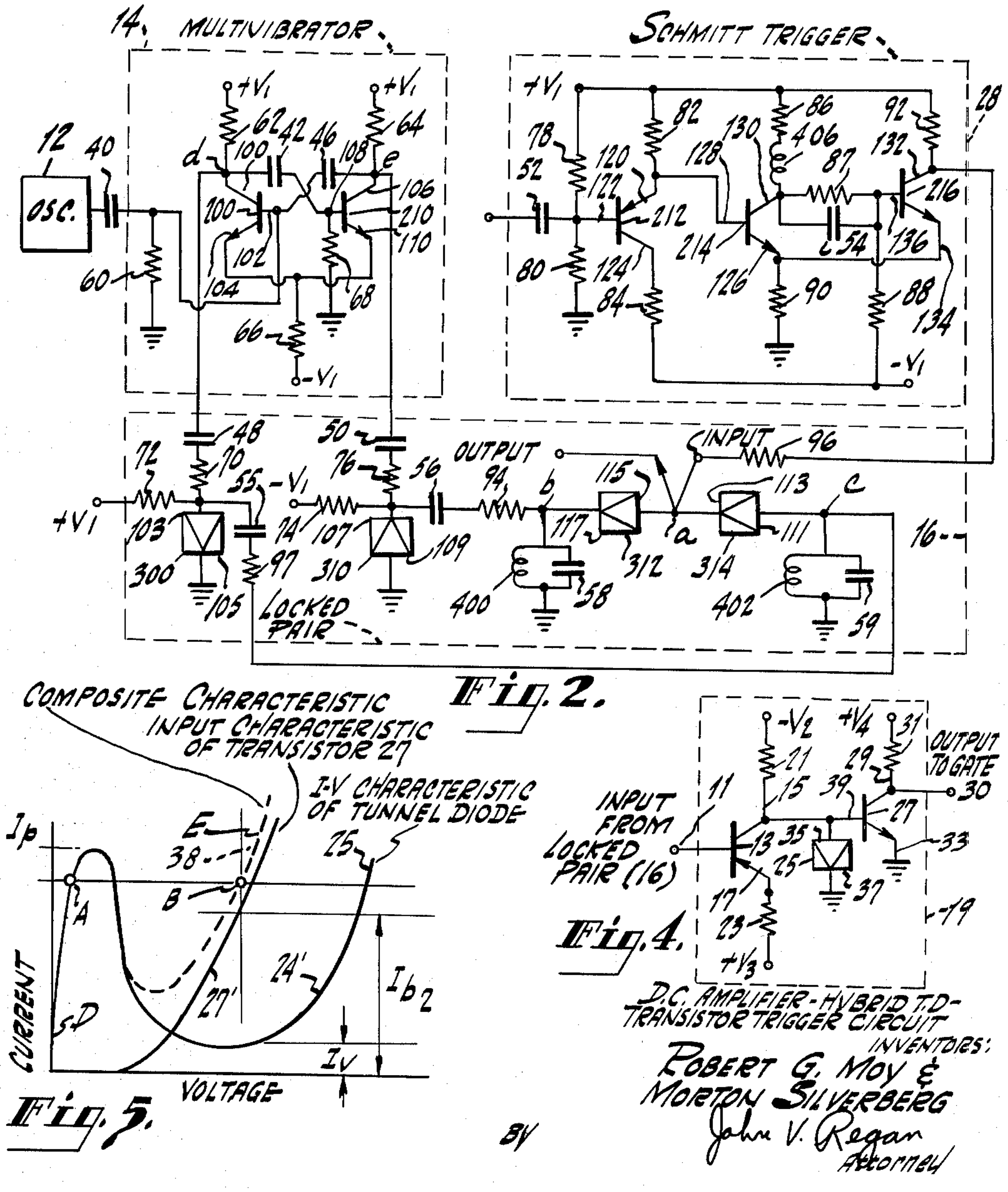
FIGURE 2 is a schematic diagram of an improved sampling and reclocking circuit for a non-return-to-zero information signal circulating according to the invention.
FIGURE 4 is a schematic diagram of another trigger circuit that may be used in place of a part of the recirculating loop shown in FIGURE 1.
FIGURE 5 is a diagram that shows the current-voltage characteristics of the trigger circuit of FIGURE 4.

FIGURE 2 shows, in greater detail, the Schmitt trigger 28 and the sampling and reclocking circuit 10, comprising oscillator 12, multivibrator 14, and tunnel diode locked pair 16.

The Schmitt trigger 28 comprises transistors 214 and 216. Collector electrode 130 of transistor 214 is coupled through peaking coil 406 and resistor 86 to a potential bias source $+V_1$, and through a parallel circuit formed by resistor 87 and capacitor 54 to the base electrode 136 of transistor 216. The emitter electrode 126 of transistor 214 and the emitter electrode 134 of transistor 126 are coupled through resistor 90 to a reference potential indicated by the conventional ground symbol. The collector electrode 132 is coupled through resistor 92 to the bias potential source $+V_1$. The base electrode 136 of transistor 216 is coupled through resistor 88 to a potential bias source $-V_1$.

The Schmitt trigger circuit is triggered at the base electrode 128 of transistor 214 by the potential at the emitter electrode 120 of transistor 212 which is directly connected to the base electrode 128 and which is coupled through resistor 82 to bias source $+V_1$. The collector electrode of transistor 212 is coupled through resistor 84 to bias source $-V_1$.

Transistor 212 is biased to be normally conductive by the voltage divider comprising resistor 78 and resistor 80 connected in a series circuit between bias source $+V_1$ and ground. Capacitor 52 couples the output of the video amplifier 26, shown in FIGURE 1, to the base electrode 122 of transistor 212 which is connected to the junction of resistors 78 and 80. The collector electrode 132 of transistor 216 constitutes the output terminal of the Schmitt trigger circuit 28, and is coupled through resistor 96 to the signal terminal *a* of the locked pair 16 in the sampling and reclocking circuit 10.

The output of the oscillator 12 is coupled to multivibrator 14 through capacitor 40 connected to the base electrode 102 of transistor 200. A resistor 60 couples the base electrode 102 of transistor 200 to ground. The emitter electrodes 104 and 110 of transistors 200 and 210, respectively, are coupled through resistor 66 to bias source $-V_1$. Transistors 200 and 210 are cross-coupled having the base electrode 102 of transistor 200 coupled through capacitor 46 to the collector electrode 106 of transistor 210, and the base electrode 108 coupled through capacitor 42 to collector electrode 100.

The collector electrode 100 of transistor 200, which constitutes the output terminal *d* of the multivibrator, is coupled through resistor 62 to bias source $+V_1$ and through capacitor 48 in series with resistor 70 to the anode electrode 103 of a tunnel diode 300. The collector electrode 106 of transistor 210, which constitutes the output terminal *e* of the multivibrator 14 is coupled through resistor 64 to a bias source $+V_1$ and through capacitor 50 in series with resistor 76 to the cathode electrode of tunnel diode 310 in the locked pair circuit 16.

Tunnel diode 300 is bistably biased by resistor 72 coupling its anode electrode 103 to bias source $+V_1$. The cathode electrode 105 of tunnel diode 300 is connected to ground. Tunnel diode 310 is bistably biased by resistor 74 coupling its cathode electrode 107 to bias source $-V_1$. The anode electrode of tunnel diode 310 is connected to ground. The anode electrode 103 of tunnel diode 300 is coupled through capacitor 55 in series with resistor 97 to power supply terminal *c* constituted by the anode electrode 111 of tunnel diode 314. The cathode electrode 107 of tunnel diode 310 is coupled through capacitor 56 connected in series with resistor 94 to power supply terminal *b* constituted by cathode electrode 117 of tunnel diode 312.

Tunnel diodes 312 and 314 are connected in series in the manner of a locked pair; the anode electrode 115 of tunnel diode 312 being connected to the cathode electrode 113 of tunnel diode 314. A tunnel diode locked pair is described, for example, in French Patent No. 1,246,-094, of January 27, 1960, to Arthur W. Lo.

Signal terminal *a* is a midpoint between tunnel diodes 312 and 314, and it receives a current input signal from the Schmitt trigger 28, and provides an output signal comprising a series of bipolar pulses. Terminal *b* is coupled to ground through a tank circuit comprising inductor 400 in parallel with capacitor 58. The tank circuit provides a ground return for tunnel diode 312 and, it is resonant at the delay line frequency to prevent loading the multivibrator-tunnel diode combination. Terminal *c* is coupled to ground through a similar tank circuit comprising inductor 402 and capacitor 59, connected in parallel, and being resonant at the delay line frequency for the above reasons.

In operation, an NRZ information signal is applied to the input of an ultrasonic delay line 24. As an illustration, the NRZ information signal shown in FIGURE 3*a* forms the word 11010001101 which is to be circulated. The NRZ signal comprises a signal level *m* which represents binary one, a signal level *n* which represents binary zero, transition *s* from level *n* to level *m* having a positive polarity, and transition *r* from level *m* to level *n* having an opposite polarity.

The output signal from the delay line is illustrated in FIGURE 3*b*. The output signal comprises at least a half cycle sinewave in response to each transition or edge of the NRZ signals. The polarity of the half cycle sinewave corresponds to the polarity of the transition which causes the response of the delay line. For example, the response to a signal representing the bits 1101 is shown in FIGURE 3*b*. The response of the delay line to the transition *s* is a full cycle sinewave, having a positive half cycle and a negative half cycle, and the response to the transition *r* is a full cycle sinewave having the opposite polarity.

Figure 3:
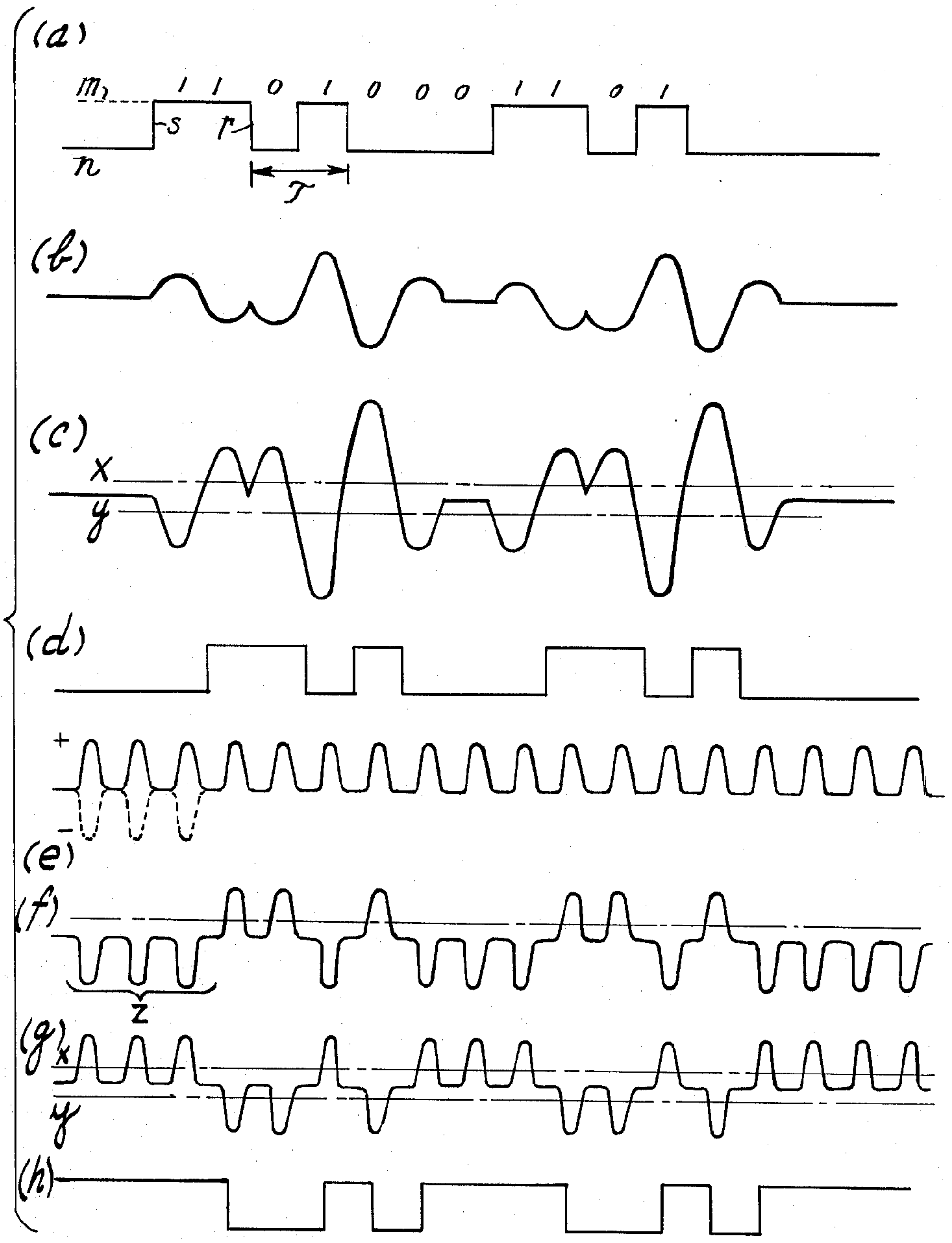
FIGURE 3 is a set of waveforms useful in describing the operation of the system shown in FIGURE 1.

The frequency of the information signal applied to the delay line is 20 mc., in the present example, and is equal to the reciprocal of the maximum period T shown in line *a* of FIGURE 3. The maximum period is equal to twice the width of one cell. The width of a cell is equal to the minimum time in which the signal remains at one level to represent a binary digit. The attenuation of the signal output of the delay line varies with frequency, and at the 20 mc. operating frequency is approximately 60 db.

The output of the delay line is coupled to the video amplifier 26, which amplifies the signal to a desired level dependent on the threshold levels of the connected Schmitt trigger 28. The threshold levels are indicated by line *c* of FIGURE 3 as dashed lines X and Y. The video amplifier may provide inversion of the signal, depending on the number of stages used. As indicated in line *c* of FIGURE 3, the signal output of the video amplifier is 180° out of phase with the input signal. The relative amplitudes of the signals in lines *b* and *c* of FIGURE 3 do not represent the actual amplification of the video amplifier nor the relative amplitude with respect to the other signals in the system but are indicated shown as a matter of convenience of illustration.

The output signal from the video amplifier is coupled to a Schmitt trigger 28 shown in FIGURE 2 of the drawings. Transistor 212 is an emitter-follower circuit whose principal function is to match the relative high output impedance of the video amplifier to the relatively low input impedance of Schmitt trigger 28.

Transistor 212 is normally biased to conduct. Transistors 214 and 216 form a bistable circuit. The circuit will be referred to as conducting when transistor 216 is conducting, and non-conducting when transistor 216 is non-conducting. Transistor 214 is always on the opposite conduction state from transistor 216. The Schmitt trigger has a conduction threshold shown in line *c* of FIGURE 3 as a dashed line *y*, and a non-conduction threshold shown as a dashed line *x*. The thresholds of the trigger circuit correspond to the voltage levels at emitter electrode 120 of transistor 212 which varies with the amplitude and polarity of the signal applied to its base electrode 122.

Before the word, shown in line *a* of FIGURE 3, is applied to the delay line 24, the Schmitt trigger 28 is rendered conductive. When the signal shown in FIGURE 3*c* is applied to the base electrode 122 of transistor 212, the first negative half cycle sinewave (the response to transitions) increases the conduction of transistor 212. The voltage at its emitter electrode 120 becomes more negative driving transistor 214 further into cut-off and the Schmitt trigger 28 remains in the same conduction state.

As the signal in FIGURE 3*c* changes polarity transistor 212 diminishes its conduction, and when its exceeds the non-conduction threshold *x* transistor 214 is rendered conductive, which in turn biases transistor 216 to be non-conductive. The output voltage at the collector electrode 132 of transistor 216 represents a binary one when transistor 216 is non-conductive, and a binary zero when transistor 216 is conductive.

The signal shown in FIGURE 3*c* after exceeding the threshold *x*, reaches a positive peak and then becomes more negative, but before it reaches the threshold *y* a transition *r* produces at new half cycle sinewave of the same polarity, so that the signal of FIGURE 3*c* becomes more positive and again exceeds the threshold *x*. The Schmitt trigger 28 is in its non-conduction state so that the trigger circuit does not respond to this half cycle sinewave and the output at the collector electrode 132 still represents a binary one.

The signal of line *c* of FIGURE 3 then becomes more negative, and when it exceeds the conduction-threshold *y*, the voltage at the emitter electrode 120 of transistor 212 becomes negative enough to render transistor 214 non-conductive, which in turn biases transistor 216 into conduction. The output voltage at the collector electrode 132 then represents a binary zero. Similarly, the Schmitt trigger 28 responds to the rest of the word reconstructing the NRZ information signal applied to the delay line 24. As shown in line *c*, FIGURE 3, at the end of the word applied to the delay line, the trigger circuit 28 remains or becomes conductive, and remains so until the next word is applied from the delay line. Line *e* of FIGURE 3 shows as a solid line the clock pulses coupled from anode electrode 103 of tunnel diode 300 to terminal *c* of the locked pair circuit 16.

The oscillator 12 drives the multivibrator circuit 14 at a 40 mc./sec. rate. (Twice the normal repetition rate of the delay line.) The multivibrator 14 is a free running multivibrator providiing complementary outputs at terminals *d* and *e*, respectively. The outputs from terminals *d* and *e* are respectively coupled to tunnel diodes 300 and 310. Tunnel diodes 300 and 310 are bistably biased, tunnel diode 300 to a positive bias potential $V_1$ and tunnel diode 310 to a negataive bias potential $-V_1$. The output signals from terminals *d* and *e* respectively switch tunnel diodes 300 and 310 from their low voltage stable operating point to their high voltage stable operating point and vice versa at the rate of the clock oscillator 12. The signals applied to terminal *c* are then the signals shown as a solid curve in line *e* of FIGURE 3 representing the change in conduction state of tunnel diode 300. The signals applied to terminal *b* as a result of the changes in conduction state of tunnel diode 310 are opposite in polarity from those shown in line *e* of FIGURE 3. The signals applied to terminals *b* and *c* constitute a paraphase driver power supply at the frequency of the clock oscillator 12.

Tunnel diodes 312 and 314 constitute a balanced pair or locked pair. When no signal is applied to the signal terminal *a*, the voltage at the terminal *a* is low, and the current flowing through the diodes depends on the voltage applied at its power terminals *b* and *c*. The voltages applied at terminals *b* and *c* are of opposite polarity and equal amplitude so that in the ideal case the pair is balanced, and the amplitude of the voltage is such so that both the diodes operate in their low voltage positive resistance region.

When a signal current is applied to the signal terminal *a* the pair is unbalanced, that is, one of the diodes is biased closer to its peak. If the current flows into the terminal *a*, then diode 312 is biased closer to its peak. When the clock pulse now is applied across the locked pair, the diode biased closer to its peak switches to its high voltage positive resistance region. The output signal derived from terminal *a* is shown in line *f* of FIGURE 3. The signal is bipolar, the polarity of each pulse depending on the polarity of the signal applied to the signal terminal *a* as previously explained, and the signal frequency is the same as the clock frequency.

When the Schmitt trigger 28 is set, that is before the word shown in line *a* of FIGURE 3 is received from the delay line 24, the output of the trigger circuit 28 biases the locked pair so that tunnel diode 314 is biased closer to its peak. The clock pulses applied to terminals *b* and *c* cause tunnel diode 314 to switch from a low voltage positive resistance region to a high voltage positive resistance region providing a series of negative pulses Z as shown in line *f* of FIGURE 3.

Signal terminal *a* is coupled through an amplifier 18 to a second Schmitt trigger 20 which may be the same as Schmitt trigger 28. As shown in line *g* of FIGURE 3, the output of the locked pair 16 is inverted by amplifier 18. The amplitudes of the signals of lines 3*f* and 3*g* are shown to be equal as a matter of convenience only.

The series of pulses Z (line *f*) is inverted by the amplifier 18 biasing the Schmitt trigger 20 to be non-conductive, so that the output of the Schmitt trigger 20 represents a binary one.

When the signal shown in line *g* of FIGURE 3 is applied to the trigger circuit 20, the output of the trigger circuit 20 continues to represent a binary one until the conduction threshold *y* is exceeded (in the negative direction). The response of the Schmitt trigger 20 to the bipolar signals derived from the amplifier 18, is shown in line *h* of FIGURE 3. The signal of line *h* is a reconstituted version of the NRZ signal of line *a* of FIGURE 3. Due to the fast response of the tunnel diodes, the locked pair circuit samples the input waveform in a very short length of time, and reclocks the NRZ signal by providing bipolar signals at the clock rate. The output of the Schmitt trigger 20 is coupled through gate 30 and line driver 22 to the input of the delay line 24.

The line driver 22, or the gate 30, may provide the desired inversion so that the signal recirculated to the input of the delay line 24 corresponds exactly to the NRZ signal first applied to the input of the delay line. The delay line is also capable of responding to the NRZ signal with a polarity opposite from the one described, which was chosen as a matter of convenience only.

FIGURE 4 is a diagram of another circuit which may be used, to reconstitute the NRZ signal in place of the amplifier 18 and the Schmitt trigger 20 shown in FIGURE 1.

The circuit that may be used is a D.C. amplifier in combination with a hybrid tunnel diode-transistor trigger circuit. The D.C. amplifier comprises a transistor 13 having its collector electrode 15 coupled through resistor 21 to a source of bias potential $-V_2$, and having its emitter electrode 17 coupled through resistor 23 to a source of bias potential $+V_3$.

The collector electrode 15 of transistor 13 is directly coupled to the anode electrode 35 of tunnel diode 25, and to the base electrode 21 of transistor 27. The collector electrode 29 of transistor 27 is coupled through resistor 31 to a source of bias potential $+V_4$. The emitter electrode 33 of transistor 27 is connected to ground. The output of the circuit 19 is taken at the collector 29 of transistor 27, and it is coupled to one of the input terminals of gate 30.

The circuit of FIGURE 4 may be more easily understood by referring to FIGURE 5 which is a current-voltage (I–V) characteristic diagram 24′ of the tunnel diode 25, the characteristic 27′ of transistor 27, and the composite characteristic 28 of the parallel combination of transistor 27 and tunnel diode 25. Transistor 13, which constitutes the D.C. amplifier of circuit 19, is a class "A" amplifier which supplies the bias current for the tunnel diode 25. The quiescent operating point A of the tunnel diode 25 is a point on the positive resistance region D of its I–V characteristic (the positive resistance region D is the same for both the I–V characteristic of tunnel diode 25 and for the composite characteristic of transistor 27 and tunnel diode 25).

Referring again to FIGURES 4 and 5, in operation, a negative pulse input at the base electrode 11 of transistor 13 provides a current increment which has a value exceeding by an amount $\Delta I$ the value of $I_p$ (the peak current of the I–V characteristic of the tunnel diode 25), and which switches the tunnel diode to a point B on the positive resistance region E of the composite characteristic. The current $I_{b2}$ then flows into the base electrode 21 of transistor 27 and renders transistor 27 fully conductive. Transistor 27 remains fully conductive until the next following negative input pulse which switches the circuit from point B back to point A rendering transistor 27 non-conductive. Thus, transistor 27 provides a positive level for each series of positive pulses of waveform (*g*) of FIGURE 3 and a negative level for each series of negative pulses so that the required NRZ waveform is reconstituted.

What is claimed is:

1. An electrical circuit comprising in combination,
an ultrasonic delay line,
means for providing to said delay line non-return-to-zero information signals having first and second signal levels with interposed transitions therebetween,
said delay line providing in response to each of the transitions in said information signal a sinewave signal having an initial polarity that corresponds to the direction of the transition producing said sinewave signal,
a trigger circuit having first and second conductive states corresponding to the initial polarity of said sinewave signals,
means coupling said trigger circuit to said delay line to be triggered into one of said conductive states depending upon the polarity of said information signals so as to produce a non-return-to-zero output signal,
a tunnel diode circuit including a pair of serially connected tunnel diodes,
means for providing first and second trains of clocking pulses of opposite polarity to opposite ends of said serially connected tunnel diodes to forward bias said diodes to operate as a balanced pair circuit, and
means for coupling said tunnel diode circuit to said trigger circuit to sample the conductive state of said trigger circuit to produce bipolar pulses of the same frequency as said clocking pulses and having a polarity that corresponds to the conductive state of said trigger circuit.

2. A circulating memory system comprising,
an ultrasonic delay line having input and output terminals,
means connected to said input terminal for providing non-return-to-zero information signals comprising first and second signal levels and transition edges between said signal levels,
a first trigger circuit, for restoring said non-return-to-zero signals, having a conduction threshold and an opposite polarity non-conduction threshold,
means coupling the output signal from the output terminal of said delay line to said first trigger circuit, said output signal comprising at least a half cycle sinewave in response to each of said edges and having a polarity determined by the polarity of said transitions, whereby when said output signal exceeds said conduction threshold said trigger circuit is triggered into conduction and when said non-conduction threshold is exceeded said trigger circuit is cut-off, said trigger circuit being constructed to remain conductive once it has been triggered until said output signal exceeds said opposite polarity non-conduction threshold, and vice versa,
means including first and second tunnel diodes connected in a series circuit cathode to anode coupled to said first trigger circuit for producing bipolar signals in accordance with the polarity of said restored non-return-to-zero signals,
means coupled to said series circuit providing alternating-current clock signals of a constant frequency across said series circuit so that the frequency of said bipolar signals is the clock frequency,
a second trigger circuit having conduction and non-conduction thresholds and being operative like said first trigger circuit,
means coupling said bipolar signals to said second trigger circuit whereby said trigger circuit provides reclocked non-return-to-zero signals having the freqency and timing of said non-return-to-zero signals applied to the input terminal of said delay line,
and means coupling said reclocked non-return-to-zero signals to said input terminal of said delay line.

3. An electrical circuit comprising in combination, an ultrasonic delay line having input and output terminals, means for providing to said input terminal a squarewave non-return-to-zero information signal having first and second signal levels with transition edges between said signal levels, said delay line providing in response to said information signals an output signal comprising a sinewave cycle for each of said transitions and having an initial polarity determined by the direction of said transitions, first and second trigger circuits, each having a conduction threshold and an opposite polarity nonconduction threshold, means for applying the output signal from said output terminal of said delay line to said first trigger circuit to trigger said circuit into conduction when said output signal exceeds said conduction level and to cut off said trigger circuit when said output signal falls below said nonconduction threshold to provide a restored squarewave information signal, first and second tunnel diodes serially connected to provide a balanced pair circuit, means coupled across said serially connected tunnel diode circuit for providing across said circuit alternating clock signals of a frequency related to said information signals, means for coupling said first trigger circuit to the junction of said first and second tunnel diodes to apply said restored squarewave information signal to said tunnel diodes to produce bipolar signals in accordance with the polarity of said restored information signals, and means for applying said bipolar signals to said second trigger circuit to produce squarewave signals corresponding to the information signals applied to the input terminal of said delay line.

References Cited by the Examiner

UNITED STATES PATENTS

| | | | |
|---|---|---|---|
| Re. 24,790 | 3/1960 | Feissel | 328—55 |
| 2,961,535 | 11/1960 | Lanning | 328—55 |
| 3,075,087 | 1/1963 | Lo | 307—88.5 |
| 3,087,123 | 4/1963 | Rubenstein et al. | 307—88.5 |
| 3,105,197 | 9/1963 | Aiken | 328—55 |
| 3,116,424 | 12/1963 | Kaenel | 307—88.5 |

OTHER REFERENCES

Metz: Improved Ultrasonic Delay Lines, Electronics, July 1949 (pages 96–97).

ARTHUR GAUSS, *Primary Examiner.*

JOHN W. HUCKERT, *Examiner.*